Aug. 2, 1960

W. C. PIETSCH 2,947,397

FLUID CLUTCH CONTROL FOR CLAMSHELL EXCAVATORS

Filed July 23, 1958

WILLIAM C. PIETSCH
INVENTOR,

BY

ATTORNEY

Aug. 2, 1960  W. C. PIETSCH  2,947,397
FLUID CLUTCH CONTROL FOR CLAMSHELL EXCAVATORS
Filed July 23, 1958  6 Sheets-Sheet 2

WILLIAM C. PIETSCH
INVENTOR,

BY
ATTORNEY

Aug. 2, 1960 W. C. PIETSCH 2,947,397
FLUID CLUTCH CONTROL FOR CLAMSHELL EXCAVATORS
Filed July 23, 1958 6 Sheets-Sheet 3

HOLDING CLUTCH - BRAKE ASSEMBLY

WILLIAM C. PIETSCH
INVENTOR.

BY

ATTORNEY

CLOSING & HOISTING POSITION

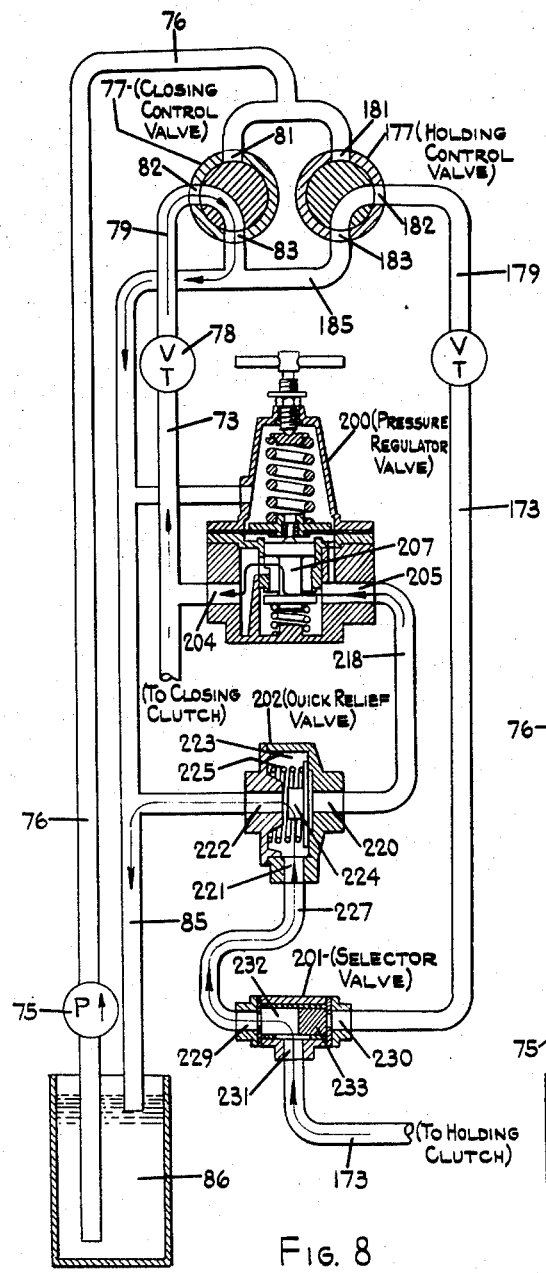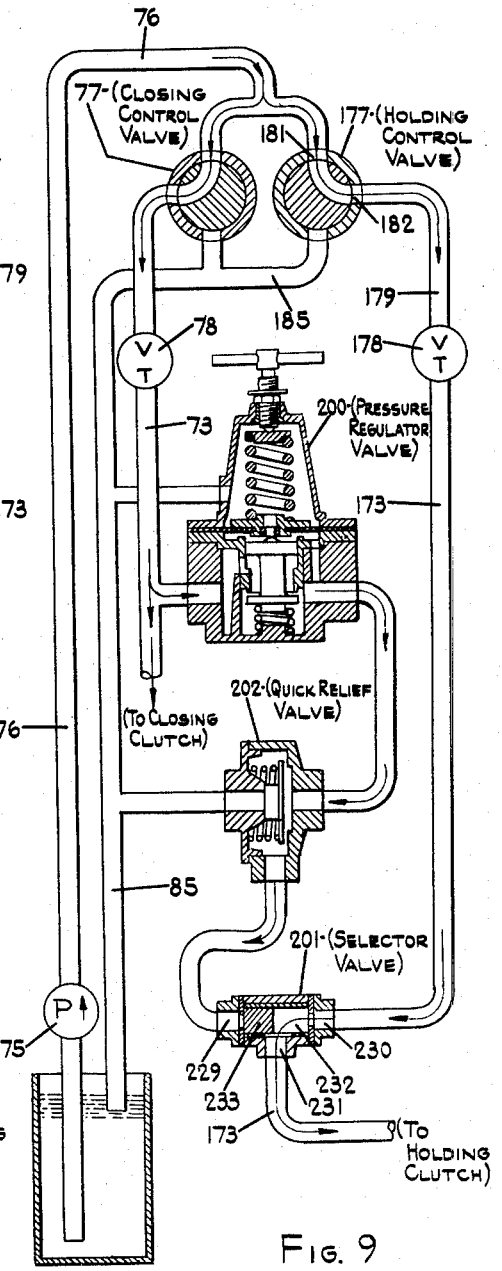
Fig. 8 — Dumping Position
Fig. 9 — Independent Holding & Raising Position
WILLIAM C. PIETSCH
INVENTOR,

CLOSING & HOISTING POSITION

United States Patent Office 2,947,397
Patented Aug. 2, 1960

2,947,397
FLUID CLUTCH CONTROL FOR CLAMSHELL EXCAVATORS

William C. Pietsch, West Allis, Wis., assignor to Bucyrus-Erie Company, South Milwaukee, Wis., a corporation of Delaware Filed July 23, 1958, Ser. No. 750,355

12 Claims. (Cl. 192—87)

This invention relates to new and useful improvements in controls for clamshell excavators in which the functions of opening and closing the bucket and the raising and lowering thereof are accomplished by two separate lines.

As applied to a clamshell excavator having a boom, these two lines normally run from two winch drums located on the main frame of the machine over two sheaves at the point of the boom to the clamshell bucket, and are commonly called the "closing line" and the "holding line" respectively. Each drum is controlled by its own clutch and brake. When the closing line is reeled in on its drum, the bucket first closes and then begins to rise, supported completely by the closing line. When the bucket is in the desired position for dumping, the holding line is held and the closing line is released, dumping the bucket. Thereafter, both lines are released and the bucket is lowered to the material to be loaded, after which the closing line is again reeled in to start another cycle.

It will be seen from the foregoing that in order to transfer the load from the closing line to the holding line, when it is desired to dump the bucket, the holding line must be reeled in with the closing line as the bucket rises, in order to keep slack out of the holding line. In the past various methods have been utilized to take up the slack in the holding line, such as to have the operator engage the holding clutch partially or intermittently during the raising of the bucket by the closing line. This, however, requires use of both of the operator's hands, leaving no hand free to control the swinging of the machine, and is furthermore impractical when the operator cannot see the bucket. In addition, a good deal of time is required for an operator to develop the coordination necessary to synchronize the two lines, during which time undue wear on the clutches and cables occurs.

Another method, disclosed for example in U.S. Patent No. 2,464,245, has been to provide some form of mechanical interlock between the control lever of one clutch and the control lever or actuating mechanism of the other; but this expedient is subject to wear in the connecting linkage and requires constant attention to keep the interlocking linkage in proper adjustment. Furthermore, such a device is not adjustable while the machine is in operation, and in addition is subject to the disadvantage that the extent to which the holding clutch is engaged varies directly with the extent to which the closing clutch is engaged and hence not enough slack will be taken up if the closing clutch is only partially engaged.

Still another method, exemplified in U.S. Patent No. 2,538,061, has been to eliminate the separate holding clutch and to provide a constant slipping engagement between the two drums so that the holding drum is always rotated when the closing drum is rotated; but this results in excessive heat, erratic operation, and rapid wear of the clutch lining. In addition, this method eliminates independent control of the holding drum, which is desirable in a versatile machine to position an open bucket or to lift a partially closed one.

STATEMENT OF OBJECTS

Accordingly, it is the principal object of this invention to provide a control for a dual winch clamshell excavator such that the means for controlling one winch may be selectively and adjustably utilized to control the operation of the other winch without any of the disadvantages present in past methods.

Another object of the invention is to provide a control in which the application of a predetermined amount of force to effect engagement of the first of two clutches will also cause a predetermined extent of engagement of the second clutch and in which the extent of engagement of the second clutch will thereafter remain constant regardless of the amount of force (in excess of said predetermined amount) applied to engage the first clutch.

Another object of the invention is to provide such a control in which each winch may nevertheless be operated completely independently of the other.

A further object of the invention is to provide a control which is adjustable at any time during the entire cycle of operation.

A further object of the invention is to provide a control which is cheaper to manufacture and easier to operate than previous devices designed for the same purpose, and which requires no periodic adjustment for wear.

In addition to my principal objects, above stated, I have worked out a number of novel and useful details, which will be readily evident as the description progresses.

My invention consists in the novel parts and in the combination and arrangement thereof, which are defined in the appended claims, and of which two embodiments are exemplified in the accompanying drawings, which are hereinafter particularly described and explained.

Throughout the description, the same reference number is applied to the same member or to similar members.

DESCRIPTION OF FIGURES

Figure 8 is similar to Figure 7 but shows the settings of the various components during the operation of dumping the bucket;

Figure 9 is similar to Figure 7 but shows the settings of the various components thereof during the operation of raising a partially closed bucket or positioning an open bucket.

GENERAL DESCRIPTION

Figure 1:
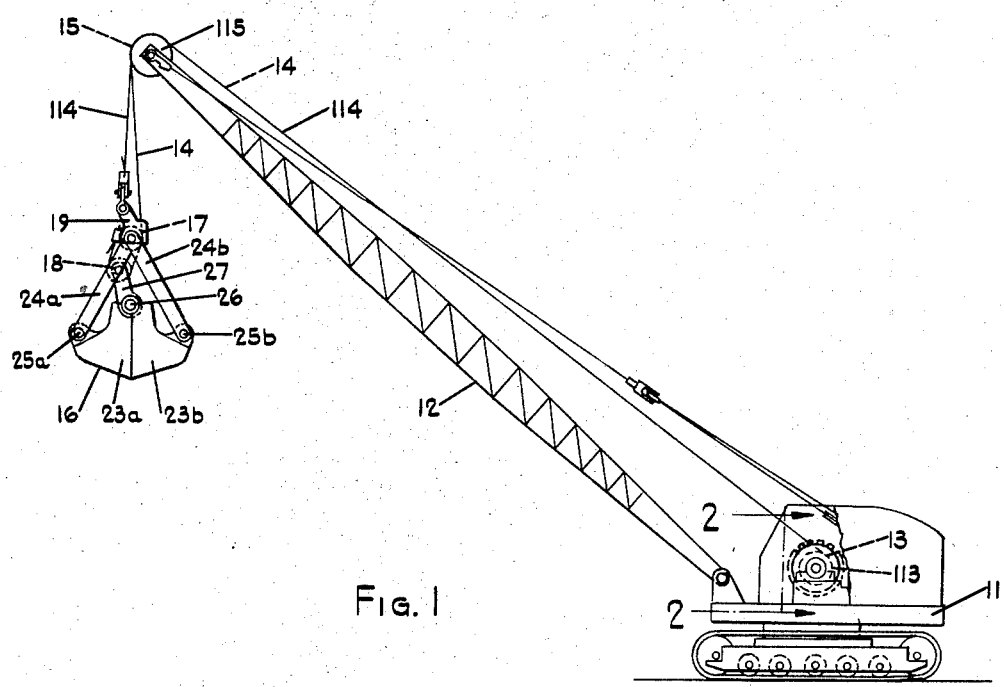
Figure 1 is a side elevation, somewhat conventionalized, of a clamshell excavator to which the invention is applicable.

Turning now to Figure 1, it is seen that the main frame 11 of the clamshell excavator supports a boom 12 for pivotal movement thereon in a vertical plane. Also mounted on main frame 11 is the closing drum 13, from which closing line 14 passes over sheave 15 at the outer point of boom 12 to a conventional clamshell bucket 16, where it passes around sheaves 17 and 18 and is finally dead-ended on clevis 19. Holding drum 113 is also mounted on main frame 11. From holding drum 113 holding line 114 passes over sheave 115 at the outer point of boom 12 and thence to clevis 19, where it is dead-ended.

Bucket 16 consists of bucket halves 23a, 23b suspended outwardly from clevis 19 by arms 24a, 24b, to which they are pivotally connected by pins 25a, 25b. Pivotally connected at 26 to the inner and upper end of each of bucket halves 23a, 23b is arm 27, which carries sheave 18 pivotally mounted thereon at its other end. Thus, by reeling in closing line 14, bucket 16 is closed as sheave 18 and arm 27 are moved upwardly relative to sheave 17 and clevis 19 on which sheave 17 is mounted.

Figure 2:
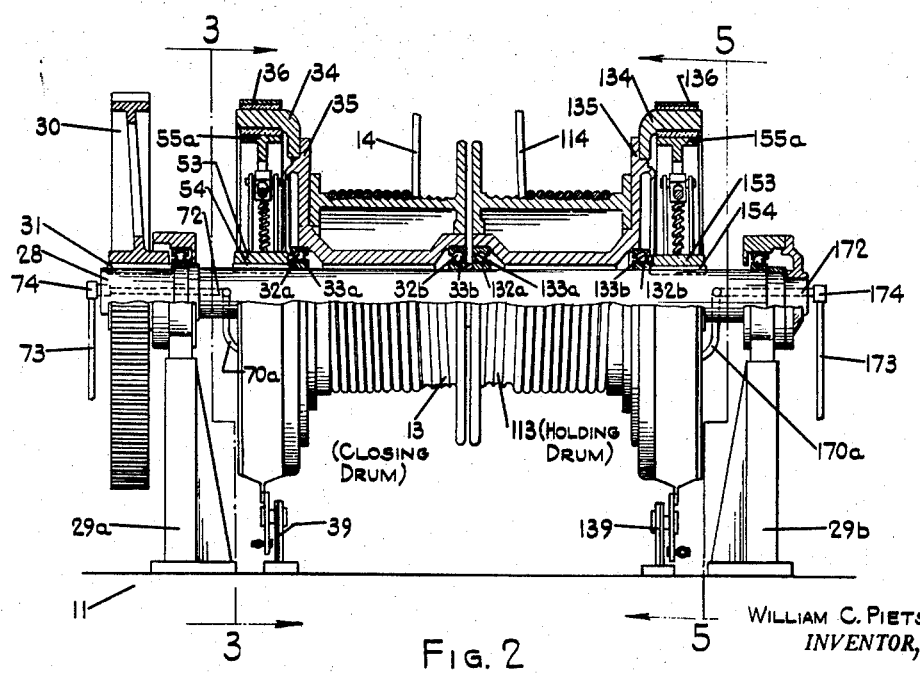
Figure 2 is an enlarged front elevation, partly in section, of the closing and holding drums and clutches and the machinery for operating the same, taken along line 2—2 of Figure 1.

In Figure 2 is shown the machinery for operating the closing and holding lines. Drive shaft 28 is journalled for rotation about a horizontal axis in supports 29a, 29b mounted on main frame 11. Hoist gear 30 is fixed to shaft 28 by key 31 and driven by any conventional means (not shown).

Closing drum 13, carrying closing line 14 is mounted for free rotation on shaft 28 by bearings 32a, 32b in races 33a, 33b respectively. Closing clutch drum 34 is rigidly mounted on the outer flange 35 of closing drum 13. Brake band 36 cooperates with the exterior of clutch drum 34 and is dead-ended at one end 37a by pin 38 to mounting bracket 39 on main frame 11 (see Figure 3). The other end 37b of band 36 is connected by pin 40 to bellcrank 41, which is pivotally mounted on bracket 39 by pin 42, so that counterclockwise rotation of bellcrank 41, effected in any suitable manner (not shown) will set the brake band 36.

Holding drum 113 carrying holding line 114 is similarly mounted for free rotation on shaft 28 by bearings 132a, 132b in races 133a, 133b respectively. Holding clutch drum 134 is rigidly mounted on the outer flange 135 of holding drum 113. Brake band 136 cooperates with the exterior of clutch drum 134 and is dead-ended at one end 137a to a mounting bracket 139 in the same manner as brake band 36 (see Figure 5). The other end 137b of band 136 is connected by pin 140 to bellcrank 141, pivoted on bracket 139 by pin 142, so that clockwise rotation of bellcrank 141 will set the brake band 136.

Figure 5:
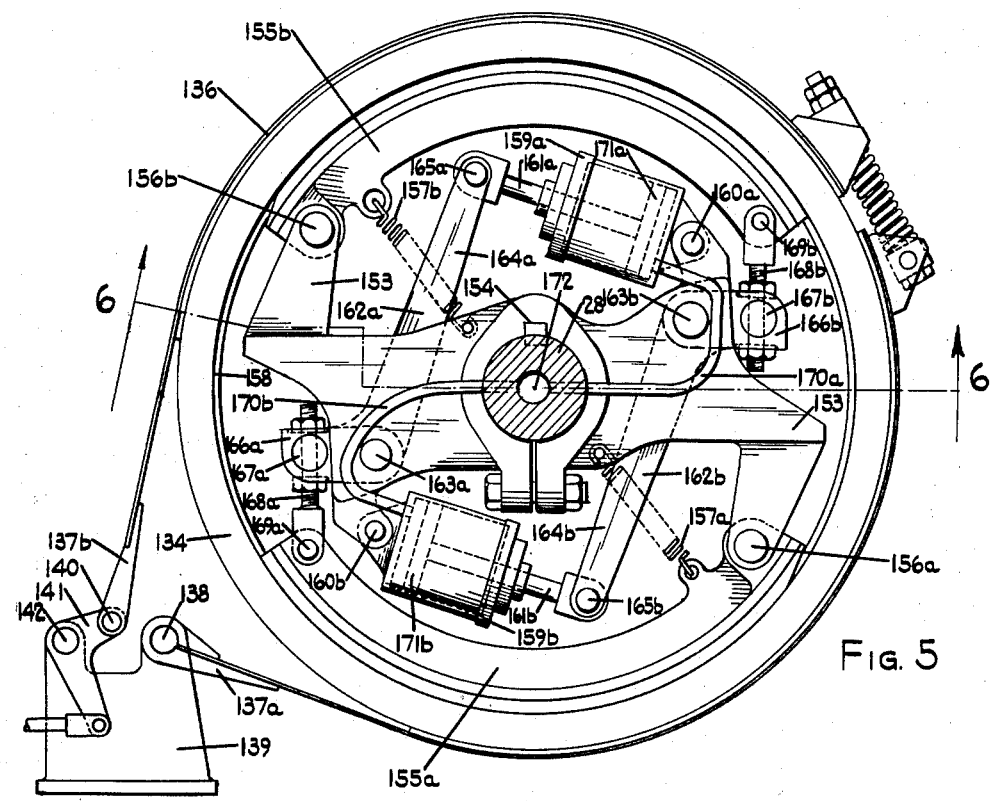
Figure 5 is an enlarged side elevation of the holding clutch, taken along line 5—5 of Figure 2.
Figure 6:
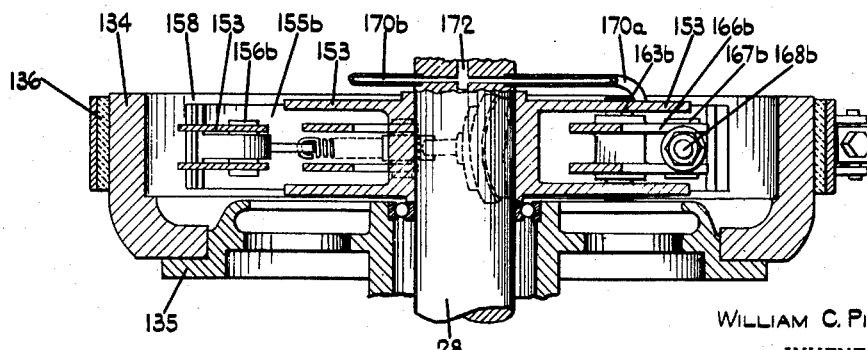
Figure 6 is a horizontal cross-section of the same taken along line 6—6 of Figure 5.

Arranged about shaft 28 and interior of each clutch drum is the clutch-actuating mechanism. Inasmuch as the closing and holding clutch actuating mechanisms are identical, although in the embodiment shown one is reversed from the other to provide for rotation in the same direction, only the closing clutch actuating mechanism will be described, although the holding clutch actuating mechanism is shown in Figures 5 and 6, with reference numbers corresponding to those of the closing clutch plus 100.

Figure 3:
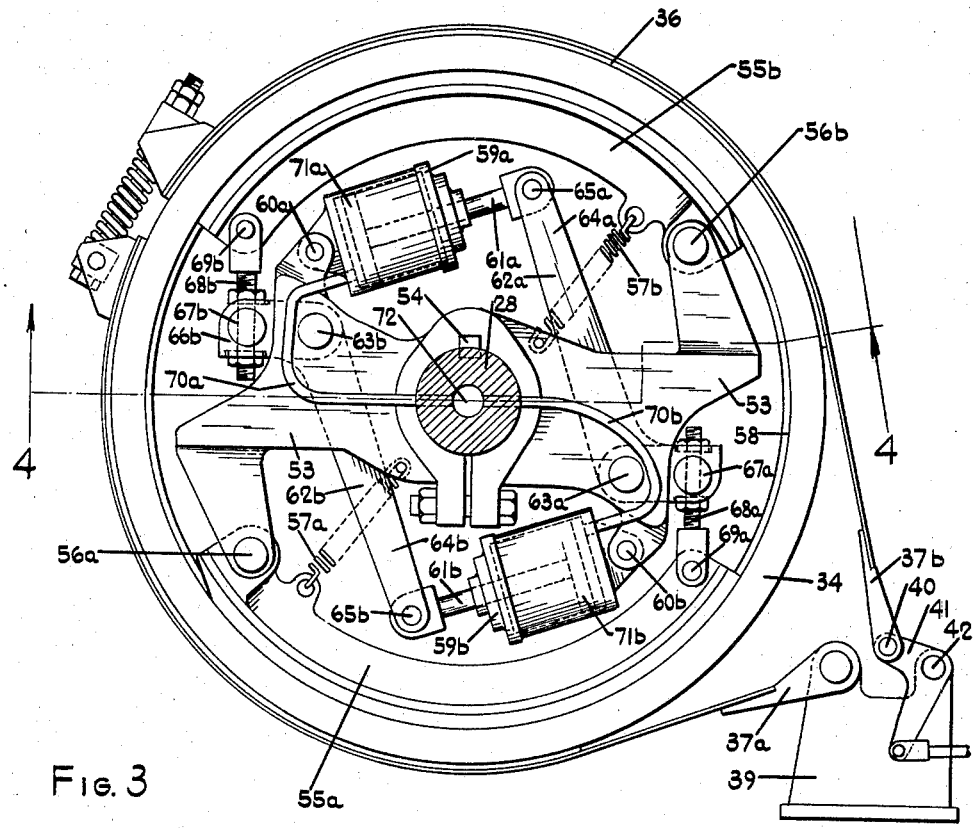
Figure 3 is a further enlarged side elevation of the closing clutch taken along line 3—3 of Figure 2.
Figure 4:
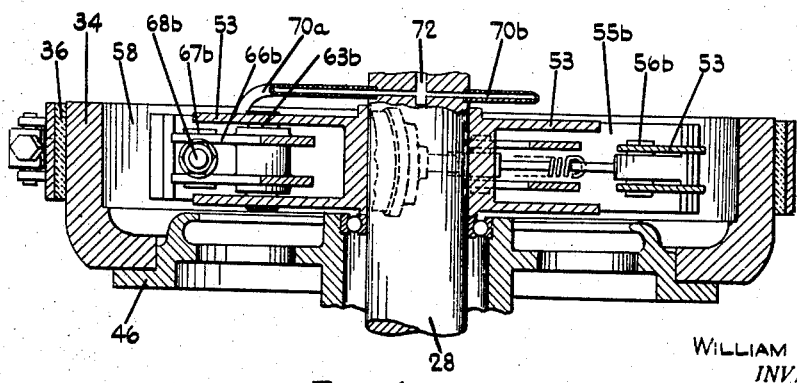
Figure 4 is a horizontal cross-section of the same taken along line 4—4 of Figure 3.

Turning to Figures 3 and 4, it is seen that the clutch-actuating mechanism comprises a mounting plate 53 secured by key 54 to shaft 28 for rotation therewith. Shoes 55a, 55b are pivotally mounted adjacent opposite ends of mounting plate 53 by pins 56a, 56b respectively. Springs 57a, 57b between the respective shoes and the mounting plate 53 bias the shoes to remain normally disengaged from annular inner face 58 of clutch drum 34. The shoes 55a, 55b are pivoted to rotate in the same direction (clockwise in Figure 3) about their respective pivot axes for engagement with face 58, so that rotation in one direction (counterclockwise in Figure 3) of mounting plate 53 relative to drum 34 tends to engage the shoes 55a, 55b with face 58, and opposite rotation of mounting plate 53 relative to drum 34 tends to disengage shoes 55a, 55b. Shoes 55a, 55b are actuated by a common actuating mechanism which includes cylinder-piston assemblies 59a, 59b respectively pivotally connected at one end by pivots 60a, 60b to mounting plate 53 and at their other end to their corresponding shoes 55a and 55b respectively. Thus in Figure 3 the cylinder 59a is pivoted at 60a to the mounting plate and the outer end of piston rod 61a is operatively connected to the shoe, preferably though not necessarily, through a bellcrank 62a, which is fulcrumed at pivot 63a on mounting plate 53. Lever 62a is interposed between the cylinder-piston assembly 59a and the shoe, to multiply the force of the cylinder-piston assembly; the long arm 64a of bellcrank 62a being pivotally connected at pivot 65a to the outer end of piston rod 61a, and the short arm 66a of bellcrank 62a being pivotally connected at pivot 67a to one end of a longitudinally adjustable screw-type link 68a which is pivotally connected at its other end by pivot 69a to the swinging end of the shoe 55a.

Pressure fluid enters the cylinder-piston assembly 59a through conduit 70a to shift piston 71a to engage the shoe, as hereinafter described, the conduits 70a, 70b being interconnected and fed by a common bore 72 in drive shaft 28, which bore is fed with pressure fluid from a source of supply to be described herein by a conduit 73 connected with shaft 28 by a rotary sealing device 74.

In operation, shoes 55a, 55b are shifted into clutching engagement with face 58 of clutch drum 34 when pressure fluid passes through conduit 73, bore 72, and conduits 70a, 70b into cylinders 59a, 59b, and shifts pistons 71a and 71b so as to rotate bellcranks 62a, 62b (clockwise in Figure 3) about pivots 63a, 63b.

DESCRIPTION OF CONTROL SYSTEM

1. General

Figure 7:
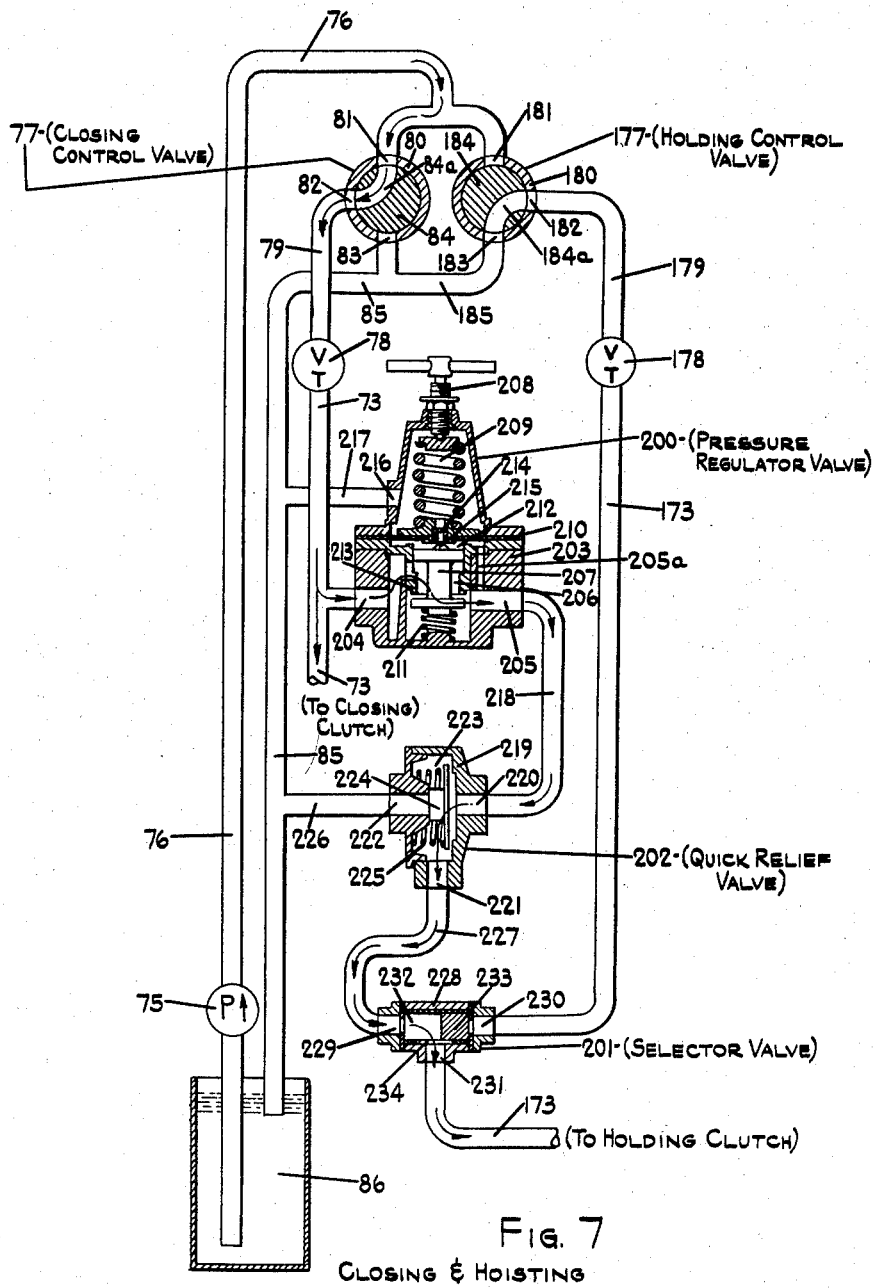
Figure 7 is a schematic representation of the control apparatus of the invention, showing the position of the various components thereof during the closing and hoisting operations.

Referring now to Figures 7 to 9, the control system which is the subject matter of the invention will be described. Although the control system shown is a closed system, the invention is equally applicable to an open system, such as a pneumatic control, in which the sump hereinafter referred to would be the atmosphere.

It will be seen from Figure 7 that the control system includes three distinct parts, namely (1) a control circuit for the closing clutch, (2) a control circuit for the holding clutch, and (3) a fluid interlock between circuits (1) and (2). Pump 75 supplies pressure fluid through conduit 76 to both the closing and holding control circuits.

2. Closing control circuit

The closing control circuit consists of a closing control valve 77 connected to conduit 76, a throttle valve 78 connected to control valve 77 by conduit 79, and conduit 73 connecting throttle valve 78 with the actuating cylinder-piston assemblies 59a, 59b of the closing clutch.

Closing control valve 77 may be any conventional reversing valve shiftable to connect one port thereof alternatively with one of two other ports thereof. As shown, closing control valve 77 comprises a casing 80 with an inlet port 81, an outlet port 82, and an exhaust port 83 therein, and a rotary member 84 containing a passage 84a rotatable to connect outlet port 82 alternatively with inlet port 81 or with exhaust port 83. Inlet port 81 is connected to conduit 76; outlet port 82 is connected to conduit 79; and exhaust port 83 is connected by conduit 85 to sump 86.

When positioned as shown in Figures 7 and 9, closing control valve 77 delivers fluid from conduit 76 to throttle valve 78, which may be adjusted to regulate the flow of pressure fluid therethrough and which in turn delivers pressure fluid through conduit 73 to the actuating cylinder-piston assemblies 59a, 59b of the closing clutch and actuates the same to set the closing clutch.

When positioned as shown in Figure 8, closing control valve 77 blocks flow of pressure fluid from pump 75 and conduit 76, and permits exhaust of fluid from actuating cylinder-piston assemblies 59a, 59b through conduit 73, throttle valve 78, conduit 79, control valve 77, and conduit 85 to sump 86.

3. *Holding control circuit*

The holding control circuit consists of a holding control valve 177, connected to conduit 76, a throttle valve 178 connected to control valve 177 by conduit 179, and conduit 173 connecting throttle valve 178 with the actuating cylinder-piston assemblies 159a, 159b of the holding clutch.

Holding control valve 177 is identical to closing control valve 77. As shown in Figure 7, holding control valve 177 comprises a casing 180 with an inlet port 181, an outlet port 182, and an exhaust port 183 therein, and a rotary member 184 with a passage 184a therein rotatable to connect outlet port 182 alternatively with inlet port 181 or with exhaust port 183. Inlet port 181 is connected to conduit 76; outlet port 182 is connected to conduit 179; and exhaust port 183 is connected by conduit 185 to conduit 85.

When positioned as shown in Figures 7 and 8, holding control valve 177 blocks any flow of fluid from conduit 76, and hence no fluid flows through the holding control circuit to actuate the holding clutch. However, when positioned as shown in Figure 9, holding control valve 177 delivers fluid from conduit 76 to throttle valve 178, which may be adjusted to regulate the flow of pressure fluid therethrough, and in turn delivers pressure fluid through conduit 173 to the actuating cylinder piston assemblies 159a, 159b of the holding clutch and actuates the same to engage the holding clutch under circumstances hereinafter described.

4. *Fluid interlock*

Interposed between the closing and holding control circuits just described is a fluid interlock which effects engagement of the holding clutch to a predetermined extent whenever the closing clutch control circuit is set to engage the closing clutch. This fluid interlock consists of a pressure regulator valve 200 connected to closing clutch conduit 73, a selector valve 201 connected to the holding clutch conduit 173, and a quick relief valve 202 interconnecting pressure regulator valve 200 and selector valve 201.

(a) *Pressure regulator valve*

Pressure regulator valve 200 is a conventional pressure regulator valve adjustable to deliver a predetermined pressure at its outlet port regardless of the pressure (in excess of the predetermined outlet pressure) at its inlet port. As shown, pressure regulator valve 200 consists of a housing 203 containing inlet port 204 and outlet port 205, which are interconnected by central chamber 206 in which valve spool 207 is mounted for sliding movement. Inlet port 204 is connected to a branch of conduit 73, and outlet port 205 is connected to conduit 218.

Valve spool 207 is adjustable to regulate pressure of fluid flowing from inlet port 204 to outlet port 205 and is positioned by adjusting screw 208, which compresses spring 209, depressing diaphragm 210 at the lower end thereof, against which valve spool 207 is held by spring 211 and the pressure fluid in chamber 206. Outlet port 205 is connected by passage 205a to chamber 212 between diaphragm 210 and valve spool 207. As long as the upward force on diaphragm 210 exerted by the pressure in outlet port 205 and hence in chamber 212 does not exceed the downward force exerted on diaphragm 210 by the predetermined setting of spring 209, valve spool 207 will be positioned as shown in Figure 7 to permit flow of fluid from inlet port 204 to outlet port 205. However, when the pressure in outlet port 205 just exceeds the downward force exerted on diaphragm 210 by the predetermined setting of spring 209, diaphragm 210 moves upwardly under action of the pressure fluid, permitting valve spool 207 to seat on shoulder 213 under action of spring 211 and of the pressure fluid in chamber 206, blocking further flow of fluid from inlet port 204 to outlet port 205.

Thus pressure regulator valve 200 delivers fluid from inlet port 204 to outlet port 205 at a predetermined pressure selected by an operator, such output pressure remaining constant for any inlet pressure in excess of said predetermined output pressure.

The type of pressure regulator valve shown has an additional feature which permits downward adjustment of the pressure delivered by the valve without the necessity of exhausting the closed fluid system beyond outlet port 205, which would be required without this feature because any decrease in downward pressure on diaphragm 210 would permit valve spool 207 to seat on shoulder 213, thus blocking any return flow of fluid from outlet port 205 and hence maintaining the previously set pressure. This feature comprises a passage 214 in diaphragm 210 which is normally sealed by ball valve 215 located on the upper face of valve spool 207. This feature plays no part in the functioning of pressure regulator valve 200 to regulate pressure delivered to outlet port 205 from inlet port 204 and is not essential to the invention, but it is preferably included because it permits an operator to decrease the pressure delivered while the system is in operation simply by adjusting screw 208 to decrease the downward force exerted on diaphragm 210. As stated, such decrease will permit valve spool 207 to seat on shoulder 213, but when it does so in the valve shown, ball valve 215 will no longer seal passage 214 but instead will permit flow of fluid from chamber 212 through exhaust port 216 and conduit 217, which is connected to conduit 85. This exhaust of fluid will continue until the pressure in outlet port 205 is reduced to the point where it equals the reduced downward force exerted on diaphragm 210 by spring 209, at which time diaphragm 210 will again seat on ball valve 215, blocking further flow of fluid through passage 214.

(b) *Selector valve*

Selector valve 201 interconnects the closing and holding clutch control circuits in such a manner that (1) whenever the closing clutch is actuated and the holding control valve blocks flow of pressure fluid from pump 75, the holding clutch will be partially engaged by the regulated pressure fluid delivered by pressure regulator valve 200 to the holding clutch through the selector valve which at the same time blocks return exhaust flow of such pressure fluid from the holding clutch through holding control valve 177 (see Figure 7) and yet (2) when independent actuation of the holding clutch is desired, the holding clutch will be actuated independently by pressure fluid delivered from pump 75 by holding control valve 177 through the selector valve which then automatically blocks the flow of pressure fluid between the holding clutch conduit 173 and the pressure regulator valve 200 (see Figure 9).

Selector valve 201 is a conventional check valve shiftable to permit flow of fluid from one of two inlet ports to an outlet port therein, while blocking flow to or from the other of said inlet ports. As shown in Figures 7 to 9, selector valve 201 comprises a casing 228 with inlet ports 229, 230 and outlet port 231 therein. Casing 228 contains a cylinder 232 therein, to which ports 229, 230, and 231 are connected. Shuttle 233 is snugly fitted within cylinder 232 for sliding movement therein and is adaptable to connect outlet port 231 alternatively to inlet port 229 (see Figure 7) or to inlet port 230 (see Figure 9), shuttle 233 being shifted into one or the other of the foregoing positions responsive to a greater fluid pressure in one of said inlet ports than in the other. Thus, as seen in Figure 7, introduction of pressure fluid into inlet port 229, from conduit 227, at a greater pressure than that of the fluid in inlet port 230, from conduit 173 of the holding control circuit, shifts shuttle 233 to close inlet port 230 and to permit flow of fluid from inlet port 229 to outlet port 231 leading through conduit 173 to the holding clutch. Alternatively, as shown in Figure 9, the introduction of fluid into inlet port 230 at a greater pressure than that of the fluid in inlet port 229 shifts shuttle 233 to close inlet port 229 and to permit flow of fluid from inlet port 230 to outlet port 231.

Outlet port 231 is spanned at its point of connection to cylinder 232 by a longitudinal slot 234, which is slightly longer than shuttle 233. Slot 234 is designed to allow flow of fluid past shuttle 233 to outlet port 231 when shuttle 233 is centered over outlet port 231 as a result of the pressure in the two inlet ports 229, 230 being equal, in order to prevent blocking of outlet port 231 by shuttle 233 during its shifting between the alternative positions shown in Figures 7 and 9.

It is to be noted that selector valve 201 is required as shown in Figures 7 to 9 only because holding control valve 177 is normally connected to exhaust when in its nonactuating position as shown in Figures 7 and 8.

Figure 10:
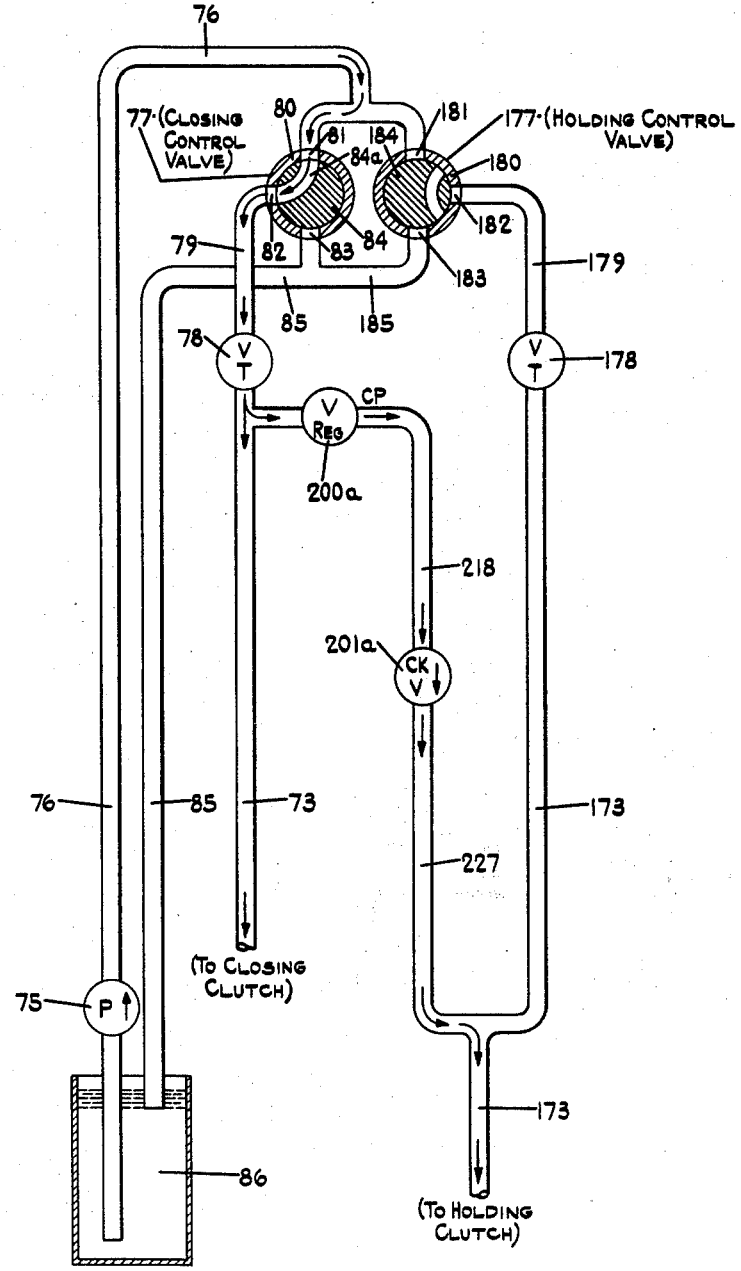
Figure 10 is a schematic representation of a second embodiment of the control system of the invention, showing the position of the various components thereof during the closing and hoisting operations.

Thus, the control system may alternatively be arranged as in the second embodiment shown in Figure 10. This embodiment is similar to the first embodiment but considerably simplified. Turning to Figure 10, it is seen that the control system is identical to the first embodiment except as follows: (1) A simplified, conventional constant pressure outlet valve 200a is substituted for pressure regulator valve 200, to deliver a predetermined constant pressure from conduit 73 to conduit 173; (2) a conventional one-way check valve 201a is interposed between constant pressure outlet valve 200a and conduit 173, and is connected so as to permit flow of fluid only from constant pressure outlet valve 200a toward conduit 173 and to block flow of fluid from conduit 173 to constant pressure outlet valve 200a; and (3) holding control valve 177 is provided with a third setting, in which outlet port 182 is completely blocked. The purposes and functioning of the substituted components are the same as those of the replaced components except that no provision is made for adjustment of the regulated pressure delivered by valve 201a.

(c) *Quick relief valve*

Quick relief valve 202 is interposed, in the fluid interlock, between selector valve 201 and pressure regulator valve 200 and is provided to quickly exhaust the high pressure fluid which passes from conduit 173 through slot 234 into conduit 227 during the shifting of shuttle 233 from its position in Figure 7 to that in Figure 9, i.e., during actuation of the holding clutch by its separate control circuit. This fluid would otherwise exhaust slowly through exhaust port 216 of pressure regulator valve 200 until the holding control valve 177 was set to exhaust, at which time the pressure of this fluid in inlet port 229 would exceed the pressure in inlet port 230 of selector valve 201. Hence shuttle 233 would shift under action of this pressure to block inlet port 230 and to connect inlet port 229 with outlet port 231, thus permitting flow of fluid through conduit 173 to the holding clutch, delaying its disengagement. Although quick relief valve 202 can therefore be eliminated, it is desirable to provide some such means to exhaust this high pressure fluid immediately upon its passing into conduit 227, so as to permit immediate disengagement of the holding clutch upon the later movement of the holding control valve 177 to its exhaust position shown in Figure 8.

Quick relief valve 202 is a conventional type of relief valve operable to connect one port thereof alternatively to one of two other ports thereof responsive to a differential in pressure between the first port and one of the second ports. As shown in Figures 7 to 9, quick relief valve 202 comprises a casing 219 with an inlet port 220, an outlet port 221, and an exhaust port 222 therein, all of said ports being connected to chamber 223. Inlet port 220 is connected to outlet port 205 of pressure regulator valve 200 by conduit 218. Exhaust port 222 is connected to exhaust conduit 85 by conduit 226. Outlet port 221 is connected to conduit 227 which leads to inlet port 229 of selector valve 201. Valve member 224 is shiftable in chamber 223 to connect outlet port 221 alternatively with inlet port 220 (Figure 7) or with exhaust port 222 (Figure 8).

As shown in Figure 8, valve member 224 is lightly biased by spring 225 to close inlet port 220 and to uncover exhaust port 222. In this position fluid is permitted to flow from outlet port 221 to exhaust port 222. However, as shown in Figure 7, upon introduction of pressure fluid into inlet port 220 at a greater pressure than that of the spring 225 and the fluid in chamber 223, valve member 224 immediately shifts to seal exhaust port 222 and to permit flow of fluid from inlet port 220 to outlet port 221. Alternatively, whenever the pressure of spring 225 and the fluid pressure in outlet port 221 exceeds the pressure in inlet port 220, valve member 224 again shifts under action of said fluid pressure and spring 225 to block inlet port 220 and to open exhaust port 222 so that fluid from conduit 227 and outlet port 221 may be exhausted.

DESCRIPTION OF OPERATION

1. *Closing and hoisting*

The operation of the control in a normal digging cycle is as follows. Assume the open bucket 16 to be resting on the ground or other material to be loaded. Referring to Figure 7, holding control valve 177 is set to connect outlet port 182 to exhaust port 183 and to seal inlet port 181. Closing control valve 77 is set to connect inlet port 81 to outlet port 82 and to seal exhaust port 83. Fluid is delivered under pressure by pump 75 through conduit 76 to closing control valve 77 and thence through conduit 79 to throttle valve 78, which is adjusted to permit the desired rate of flow of pressure fluid. Pressure fluid then flows from throttle valve 78 through conduit 73 directly to the closing clutch, where it actuates the two cylinder-piston assemblies 59a, 59b and sets the clutch as described above. When the closing clutch is set, closing drum 13 winds in closing line 14, first closing bucket 16 and then raising it.

At the same time pressure fluid flows through conduit 73 to inlet port 204 of pressure regulator valve 200. Pressure regulator valve 200 is adjusted by the operator, either by making a predetermined setting or by observing the two lines in operation, so as to cause just sufficient partial engagement of the holding clutch to take the slack out of holding line 114. When valve spool 207 is moved downwardly by such adjustment, fluid is free to flow through pressure regulator valve 200 and out of outlet port 205 at the predetermined reduced pressure, as described herein above. Fluid at the reduced pressure delivered by pressure regulator valve 200 then flows through conduit 218 to inlet port 220 of quick relief valve 202, where it overcomes the pressure exerted on valve member 224 by spring 225 and moves valve member 224 to uncover inlet port 220 and to seal exhaust port 222. Pressure fluid then flows through quick relief valve 202 and conduit 227 to inlet port 229 of selector valve 201, where it forces shuttle 233 to the opposite end of cylinder 232, sealing inlet port 230. The fluid then flows through selector valve 201 into conduit 173 and thence to the actuating cylinder piston assemblies 159a, 159b of the holding clutch (see Figures 2 and 5). Inasmuch as the pressure fluid is delivered to the holding clutch cylinder piston assemblies 159a, 159b only at the reduced pressure delivered by pressure regulator valve 200, the holding clutch is only partially engaged and causes just sufficient drag on holding drum 113 to take the slack out of holding line 114, without causing sufficient tension therein to cause the holding line 114 to overtake closing line 14. The bucket is thus loaded and raised simply by operating the closing clutch control, while at the same time the holding line is automatically taken in the proper amount to eliminate slack therein.

The operation of the second embodiment is exactly the same as the first, except that (1) valve 200a is predeterminedly set to deliver just sufficient reduced pressure to the holding clutch to cause the required amount of drag, and (2) the fluid delivered by valve 200a flows directly through check valve 201a to the holding clutch, the passage to exhaust being blocked in this embodiment by the setting of holding control valve 177 shown in Figure 10 rather than by the blocking of inlet port 230 by shuttle 233.

2. Dumping

When the bucket 16 has reached the desired height, both the closing and holding brakes 36 and 136 are set to hold the bucket in that position, and the closing clutch is disengaged by operating closing control valve 77 to connect outlet port 82 and exhaust port 83 together (see Figure 8). Flow of pressure fluid from pump 75 is thus cut off, and conduit 73 is connected directly to sump 86, permitting return flow from cylinder-piston assemblies 59a, 59b through conduit 73, throttle valve 78, closing control valve 77 and conduit 85. As the same time, the setting of valve spool 207 of pressure regulator valve 200 being unchanged, fluid exhausts from conduit 218 through the pressure regulator valve 200. When this occurs, spring 225 and the fluid pressure in outlet port 221 of quick relief valve 202 cause valve member 224 to move to seal inlet port 220 and to uncover exhaust port 222. Fluid from the actuating cylinder-piston assemblies 159a, 159b of the holding clutch then exhausts through selector valve 201, conduit 227, quick relief valve 202, and exhaust conduit 85.

Bucket 16 is then swung to the desired dumping location, at which point closing brake band 36 is released, allowing closing clutch drum 34 and closing drum 13 to rotate freely and pay out closing line 14. Bucket 16 then opens under the weight of bucket halves 23a, 23b, dumping its contents. Bucket 16 is then repositioned over the material to be loaded, and holding brake band 136 is released, permitting holding clutch drum 134 and holding drum 113 to rotate freely and pay out holding line 114 so that bucket 16, still open, is lowered to the material to be loaded. This completes the normal digging cycle.

The operation of the second embodiment is exactly the same as the first except that the holding control valve 177 is shifted from its position in Figure 10 to that in Figure 8 at the same time the closing control valve 77 is shifted to its position in Figure 8. Fluid from the actuating cylinder-piston assemblies 159a, 159b of the holding clutch then exhausts through conduit 173, throttle valve 178, holding control valve 177, and conduit 185 to exhaust conduit 85, the flow toward valve 200a from conduit 173 being blocked in this instance by check valve 201a. Fluid from conduit 218 exhausts through valve 200a to conduit 73.

3. Raising open bucket

At times it may be desirable to provide independent control of the holding clutch, so as to be able to lift a partially closed bucket, as for example when digging in sticky material or when using the bucket as a grapple. Independent control of the holding clutch is also necessary in order to reposition an open bucket. The present invention provides such independent control by means of holding control valve 177 and selector valve 201. As shown in Figure 9, holding control valve 177 may be positioned to connect inlet port 181 with outlet port 182 to deliver pressure fluid from pump 75 to conduit 179 and throttle valve 178, which regulates the flow of fluid through conduit 173, and thence to inlet port 230 of selector valve 201. When the pressure in inlet port 230 exceeds that in inlet port 229, shuttle 233 is shifted from inlet port 230 to the opposite end of cylinder 232, blocking inlet port 229, and directing pressure fluid from inlet port 230 to outlet port 231 and thence to the actuating cylinder-piston assemblies 159a, 159b of the holding clutch. By appropriate adjustment of throttle valves 78 and 178, the pressure delivered to the holding clutch may therefore be made to exceed that delivered to the closing clutch, so that holding line 114 raises bucket 16 while the closing clutch is slipping and merely keeping slack out of closing line 14 or partially closing bucket 16.

In the operation of the second embodiment, closing control valve 77 and holding control valve 177 are also set as indicated in Figure 9. The closing clutch is actuated exactly as described in the first embodiment. The holding clutch is actuated as described in the first embodiment, except that flow of fluid from conduit 173 toward valve 200a is blocked by check valve 201a in this embodiment, rather than by selector valve 201.

Having now described and illustrated two embodiments of the invention, it is to be understood that the invention is not to be limited to the specific form or arrangement of parts herein described and shown.

What is claimed is:

1. In a winch and associated controls for the operation of a clamshell excavator, the combination of: a constantly rotating element; a closing drum; a closing drum clutch, to impart the rotation of the rotating element to the closing drum; pressure-fluid closing-clutch actuating means to actuate the closing drum clutch; a holding drum; a holding drum clutch, to impart the rotation of the rotating member to the holding drum; pressure-fluid holding-clutch actuating means to actuate the holding drum clutch; a pressure fluid source; a sump; a first fluid conduit connecting the source to the pressure fluid closing clutch actuating means; a second fluid conduit connecting the source to the pressure fluid holding clutch actuating means; closing clutch valve means interposed in the first fluid conduit; holding clutch valve means interposed in the second fluid conduit; third fluid conduit means connecting each said valve means with the sump; each said valve means being shiftable alternatively to connect its associated pressure-fluid actuating means to the source or to the sump; a pressure fluid responsive selector valve interposed in said second fluid conduit intermediate the holding clutch valve means and the holding clutch actuating means; a fourth fluid conduit interconnecting said selector valve and said first fluid conduit intermediate the closing clutch valve means and the closing clutch actuating means; and fluid-pressure control means interposed in said fourth fluid conduit; said fluid-pressure control means being adjustable to proportion the flow of fluid from said first fluid conduit to said second fluid conduit and being responsive to fluid pressure in said fourth fluid conduit to maintain said pressure at a predetermined level; and said selector valve being shiftable alternatively (1) to block flow of pressure fluid between said fluid-pressure control means and said second fluid conduit and to admit pressure fluid from the holding clutch valve means to the holding clutch actuating means responsive to pressure in the second fluid conduit, and (2) to block flow of pressure fluid between the holding clutch valve means and said fourth fluid conduit and to admit fluid under pressure predetermined by said fluid pressure control means from said fourth fluid conduit to the holding clutch actuating means responsive to pressure in the fourth fluid conduit.

2. A winch and associated controls for the operation of a clamshell excavator, according to claim 1, further characterized by having fluid pressure responsive quick relief valve means interposed in the fourth fluid conduit between said selector valve and said fluid pressure control means; said quick relief valve means having an inlet port connected to said fluid pressure control means, an outlet port connected to the selector valve, and an exhaust port, and being shiftable alternatively, responsive to the differential in pressure between said inlet and outlet ports, (1) to block exhaust flow of fluid through said exhaust port from said fourth fluid conduit and to admit fluid from the said fluid pressure control means to said selector valve through said inlet and outlet ports and (2) to block flow of fluid from said fluid pressure control means to said selector valve and to exhaust fluid from said selector valve and fourth fluid conduit through said exhaust port.

3. In a winch and associated controls for the operation of a clamshell excavator, the combination of: a constantly rotating element; two drums mounted for free rotation thereon; a fluid actuated clutch for each drum to impart to the drum the rotation of the rotating element; pressure fluid actuating means to actuate each clutch; a pressure fluid source; a first fluid conduit connecting the source to one actuating means; a second fluid conduit connecting the source to the other actuating means; valve means interposed in each of said conduits shiftable alternatively to admit or to block flow of fluid from the source to the actuating means associated with the respective fluid conduit; and fluid pressure control means interconnecting said conduits at a point in each conduit intermediate its associated valve means and actuating means, to regulate the pressure of fluid flowing from the first conduit to the second at a predetermined fluid pressure.

4. A winch and associated controls for the operation of a clamshell excavator, according to claim 3, further characterized by having valve means interposed in the second conduit to block, responsive to said predetermined fluid pressure, the flow of pressure fluid in said second conduit between said interconnecting fluid pressure control means and the first said valve means associated with said second conduit.

5. A winch and associated controls for the operation of a clamshell excavator, according to claim 3, further characterized by having valve means interposed in the connection between the fluid pressure control means and the second conduit to block, responsive to predetermined fluid pressure in the second conduit, the flow of pressure fluid between the said first and second conduits.

6. In a winch and associated controls for the operation of a clamshell excavator, the combination of: a constantly rotating element; two drums mounted for free rotation thereon; a fluid actuating clutch for each of said drums, to impart the rotation of the rotating element to its associated drum; a pressure fluid actuating means to actuate each of said clutches; a pressure fluid source; a first fluid conduit connecting the source to one of said actuating means; a second fluid conduit connecting the source to the other of said actuating means; a valve means interposed in each of said conduits; each valve means being shiftable alternatively to admit or to block flow of fluid from the source to its associated actuating means; a selector valve interposed in the second fluid conduit intermediate the valve means and actuating means associated therewith; and pressure fluid control means interconnecting said selector valve and said first fluid conduit at a point in said first fluid conduit intermediate the valve means and clutch actuating means associated therewith; said fluid pressure control means being adjustable to proportion the flow of fluid from said first conduit to its associated actuating means and to said second conduit; and said selector valve being shiftable alternatively, responsive to the differential in fluid pressure produced at the selector valve by the fluid pressure control means and by the valve means in the second fluid conduit, (1) to admit fluid from said fluid pressure control means to the actuating means associated with the second fluid conduit and to block flow of fluid from said fluid pressure control means to the valve means of the second fluid conduit and (2) to block flow of fluid from the fluid pressure control means to the second fluid conduit and to admit fluid from the valve means of the second fluid conduit to its associated clutch actuating means.

7. In a winch and associated controls for the operation of a clamshell excavator, the combination of: a constantly rotating element; two drums mounted for free rotation thereon; a fluid-actuated clutch for each of said drums to impart the rotation of the rotating element to the drum; pressure fluid clutch-actuating means to actuate each clutch; a pressure fluid source; a first fluid conduit connecting the source to one of said clutch-actuating means; a second fluid conduit connecting the source to the other of said clutch-actuating means; valve means interposed in each of said conduits shiftable alternatively to admit or to block flow of pressure fluid from the source to the clutch-actuating means associated with the conduit; and pressure fluid interlock means connecting the first and second conduits at a point in each conduit intermediate its valve means and its associated clutch-actuating means; said interlock means including a fluid pressure regulating valve adjustable to proportion the pressure of fluid flowing from the first conduit to the clutch-actuating means associated with the second conduit.

8. In a winch and associated control for the operation of a clamshell excavator, the combination of: a constantly rotating element; two drums mounted for free rotation thereon; a fluid actuated clutch for each of said drums to impart the rotation of the rotating element to each respective drum; pressure fluid clutch actuating means to actuate the closing of each clutch; a pressure fluid source; a first fluid control means connecting the source to one of said clutch actuating means, including valve means shiftable alternatively to admit or to block flow of pressure fluid from the source to said one of said actuating means; second fluid control means connected to the first fluid control means and the other clutch actuating means; second valve means connected to the source and to the second fluid control means, and shiftable alternatively to admit or to block flow of pressure fluid from the source to the second fluid control means; said second fluid control means being automatically shiftable to connect alternatively the first valve means and the second valve means to the other clutch actuating means responsive to differential in fluid pressure delivered to the second fluid control means by the first fluid control means and the second valve means respectively.

9. A winch and associated controls according to claim 8, further characterized by the fact that the first fluid control means includes a fluid pressure regulator valve adjustable to fix the pressure of fluid flowing from the first fluid control means to said other clutch actuating means at a predetermined amount less than the pressure of fluid flowing to said one of the clutch actuating means.

10. In a winch and associated controls for the operation of a clamshell excavator, the combination of: a constantly rotating element; two drums mounted for free rotation thereon; a fluid actuated clutch for each of said drums to impart the rotation of the rotating element to each respective drum; pressure fluid actuating means to actuate each clutch; a pressure fluid source; a first fluid control means connecting the source to one of said actuating means; a second fluid control means connecting the source to the other of said actuating means; a third fluid control means of the pressure regulating type connecting said first control means with the other of said actuating means; and valve means interposed between said third fluid control means and the other of said actuating means to permit flow of fluid only in the direction from said third fluid control means to the other of said actuating means.

11. A winch and associated controls for the operation of a clamshell excavator according to claim 10, further characterized by the fact that said valve means comprises a selector valve interconnecting said first two fluid control means and said other actuating means, said selector valve being shiftable alternatively, responsive to the differential in pressure between said first two fluid control means, to connect either said second or said third fluid control means to said other actuating means and to block flow of fluid from the one of said second and third fluid control means not so connected.

12. In a winch and associated controls for the operation of a clamshell excavator, the combination of a constantly rotating element; two drums mounted for free rotation thereon; a fluid actuated clutch for each of said drums to impart the rotation of the rotating element to each respective drum; pressure fluid clutch actuating means to actuate the closing of each clutch; a pressure fluid source; and fluid control means connecting the source to each of said actuating means, including first conduit means connecting the source to both actuating means; first valve means interposed in the first conduit means to admit or to block flow of pressure fluid from the source to said actuating means; fluid pressure regulating means interposed in said first conduit means intermediate the first valve means and one of said actuating means; second conduit means connecting the source to said one of the actuating means; second valve means interposed in the second conduit means to admit or to block flow of pressure fluid from the source to said one of the actuating means; and check valve means interconnecting the first and second conduit means to block flow of pressure fluid from the second conduit to the first conduit when fluid pressure applied to said one of the actuating means through the second conduit means exceeds that applied thereto through the first conduit means.

References Cited in the file of this patent

UNITED STATES PATENTS

| | | |
|---|---|---|
| 2,591,201 | Rowand | Apr. 1, 1952 |
| 2,598,023 | Stevens | May 27, 1952 |
| 2,798,626 | Lapsley | July 9, 1957 |
| 2,859,593 | Brunot | Nov. 11, 1958 |